United States Patent Office

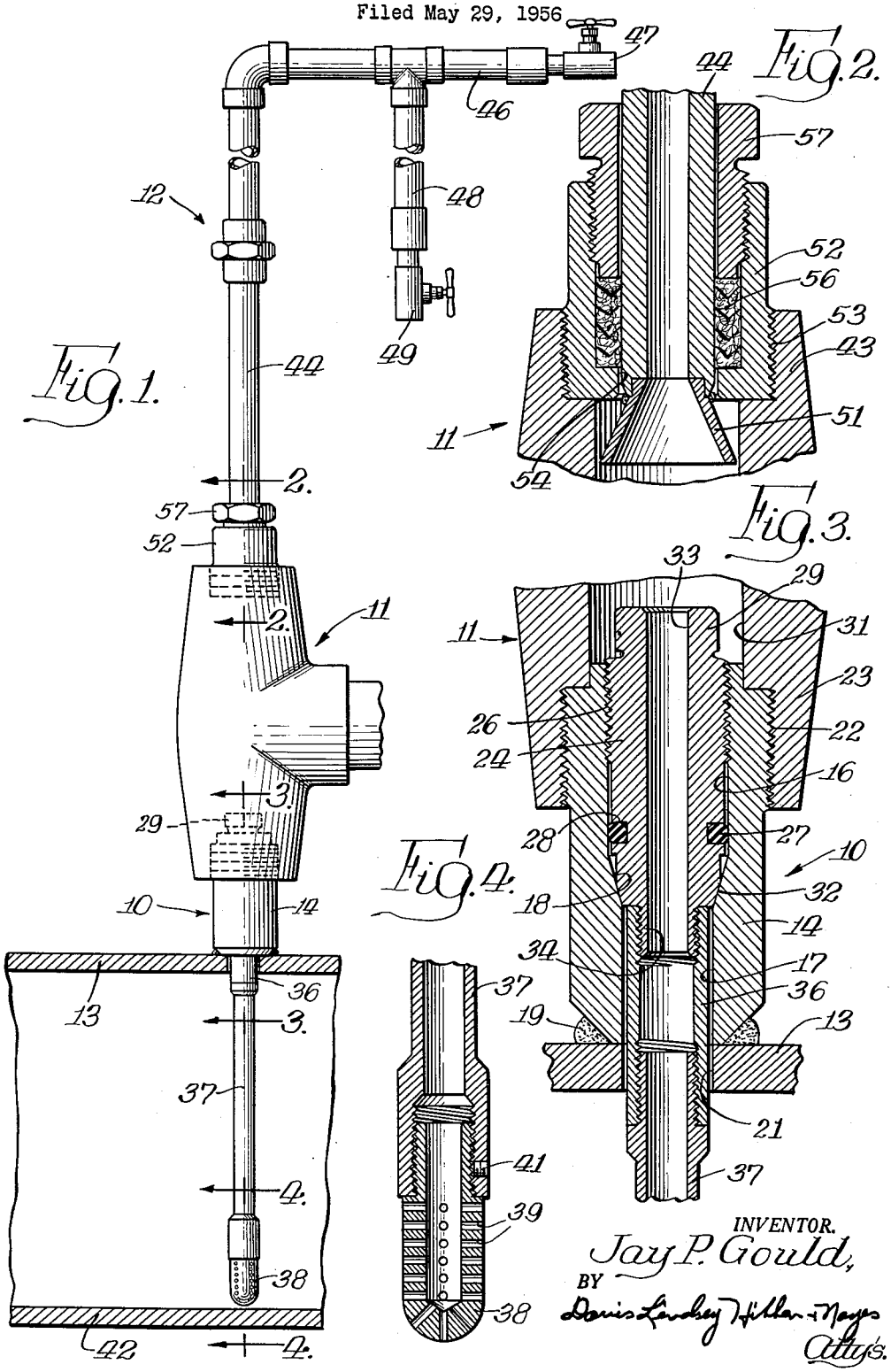

2,986,939
Patented June 6, 1961

2,986,939
FLUID SAMPLING APPARATUS
Jay P. Gould, Glendale, Calif. (% Corona Oil Specialties and Service Company, P.O. Box 277, La Canada, Calif.)
Filed May 29, 1956, Ser. No. 588,071
1 Claim. (Cl. 73—422)

This invention relates to an apparatus or device for obtaining a fluid sample from a container such as a pipe or vessel containing a fluid under pressure.

In my co-pending application Serial No. 160,222, filed May 5, 1950, now Patent No. 2,804,279, I have described and claimed a so-called adapter for attachment to a pipe, vessel, or other container for fluid under pressure. Briefly, this adapter comprises a tubular body having an internal seat and a movable plug portion threadedly mounted in the body. The body of the adapter is attached to the pipe or vessel at an opening in the wall thereof. The plug has internal porting and is provided with suitable sealing means cooperable with the body seat so that in different positions of the plug the adapter is either closed or open to the fluid under pressure. By means of this special adapter it is possible to take pressure readings in a pipe line or well head and otherwise make entry at any time without the necessity of using heavy duty valves which are both costly and undependable because of the tendency of the valve parts to "freeze" when exposed to the working fluid under pressure.

One of the advantages of this adapter is that by means of special internal plug portions or auxiliary attachments the device can be used for many different purposes. For example, in my related co-pending application Serial No. 297,588, filed July 7, 1952, now Patent No. 2,752,228, I have shown how the adapter can be employed to obtain flow data by means of a Venturi and also in corrosion studies. For the latter purpose, a test specimen or coupon is suspended from the internal plug portion of the adapter so as to be exposed to fluid in the line or vessel for a desired test period.

If it has been determined by the use of corrosion test specimens or coupons that corrosion does exist, the next problem confronting the operator is how to obtain a sample of the material causing the corrosion while the pipe or vessel is under full pressure. This problem is particularly acute in gas pipe lines which frequently contain unavoidable quantities of moisture thereby contributing to the existence of a corrosion problem.

Accordingly, it is a primary object of the present invention to provide improved facilities for the study of internal corrosion in pipe lines, towers, vessels and like containers while maintaining the system under full pressure and normal operating conditions.

A further object of the invention is to provide a novel and improved apparatus for obtaining a sample of a fluid under pressure from a pipe line, vessel, or other container.

Another object of the invention is to provide a fluid sampling device of the aforementioned character which is adapted for temporary installation and has readily removable and interchangeable parts for use with pipe lines or vessels of different size.

Other objects and advantages of the invention will become evident from the subsequent detailed description taken in conjunction with the accompanying drawing, wherein:

FIG. 1 is an elevational view showing one specific embodiment of the fluid sampling apparatus as attached to a pipe line;

FIG. 2 is an enlarged fragmentary sectional view taken along the line 2—2 of FIG. 1;

FIG. 3 is an enlarged fragmentary sectional view as taken along the line 3—3 of FIG. 1; and FIG. 4 is an enlarged fragmentary sectional view as taken along the line 4—4 of FIG. 1.

Referring to the drawing, the illustrated embodiment of the invention comprises a special sampling adapter, indicated generally at 10, a main valve 11 connected to the adapter 10, and a sample withdrawal arrangement 12 connected at the opposite side of the valve 11. For purposes of illustration, the device is shown with the adapter 10 attached to an upper wall portion 13 of a pipe line such as a natural gas pipe line.

As seen in FIG. 3, the adapter 10 comprises an elongated tubular body 14 having a relatively enlarged axial bore portion 16 at its upper end and a smaller bore portion 17 at its lower end with a tapered shoulder or seat 18 therebetween. The body 14 is in this case permanently attached to the pipe wall 13 by welding 19 so that the inner bore of the body 14 is aligned with an opening 21 in the pipe line wall 13. The upper end of the adapter body 14 is externally threaded, as at 22, and is connected to a threaded inlet 23 on the valve 11.

Removably mounted in the bore of the adapter body 14 is an internal carrier plug 24 having a threaded connection 26 with the upper end of the bore portion 16 of the body 14. A compressible seal such as an O-ring 27 is carried in a circumferential groove 28 in the plug 24 and coacts with the smooth or unthreaded portion of the bore 16 so as to protect the threaded connection 26 from exposure to working fluid during a sampling period. The upper end portion of the plug 24 is formed with a hexagonal head 29 which projects axially from the body 14 into an inner passage 31 of the valve inlet 23. As hereinafter described, the head 29 may be grasped and manipulated by means of a suitable tool extending through the valve 11 so as to effect removal or installation of the plug 24 whenever desired. The lower end of the plug 24 has a tapered shoulder or abutment 32 which seats against the complementary shoulder 18 on the body 14 so as to limit the extent of inward movement of the plug 24 and thereby position the plug accurately with respect to the pipe line.

The plug 24 is also provided with an axial bore or passage 33 and has a depending externally threaded stem 34 at its lower end. Detachably connected to the threaded stem 34 by means of a threaded coupling 36 is an elongated tubular extension nipple 37 which projects through the opening 21 in the pipe line wall 13 into the interior of the pipe line. Referring to FIG. 4 the lower end of the extension nipple 37 has threadedly connected thereto a generally cup-shaped "catch" or fluid intake element 38 which is provided with a plurality of perforations 39 throughout the walls thereof. A set screw 41 is also provided for locking the intake element 38 securely to the extension nipple 37.

As shown in FIG. 1, the length of the extension nipple 37 is preferably selected so as to position the intake element 38 closely adjacent the opposite or bottom wall portion 42 of the pipe line. The location of the sample intake in close proximity to the bottom wall portion of the pipe or vessel is frequently important, especially when the quantity of water or other corrosive liquid may be relatively small. By means of the detachable coupling 36 and the detachable intake element 38 it is possible to select an extension nipple 37 of the correct length to accommodate any given pipe line or vessel.

At the outlet end, designated at 43, of the valve 11 means is provided for controlled withdrawal of the fluid sample. In the case of a gas pipe line where the sample withdrawn comprises a mixture of gas and liquid, the arrangement shown in FIG. 1 is particularly advantageous. Thus, a small vertical pipe or conduit 44 extends from the outlet 43 of the valve 11 and terminates in a horizontal branch pipe 46 having a valve 47 and a depending or vertical branch pipe 48 having a valve 49. As will hereinafter appear, this arrangement permits bleeding off or venting of the gas portion of the sample through the valve 47 prior to withdrawal of the liquid portion of the sample through the valve 49.

As heretofore indicated, the interior passage 31 through the valve 11 must be of sufficient size to permit passage therethrough of a suitable tool for withdrawing and inserting the plug 24 when the valve 11 is in open position. However, since the quantity of liquid in a given sample is frequently rather small, the sample withdrawal line 44 communicating with the valve outlet 43 is necessarily rather small in diameter in comparison with the size of the valve passage 31. In order to eliminate or at least minimize turbulence and possible drop-out of liquid at the juncture between the enlarged valve outlet and the restricted withdrawal line 44, I provide a generally frusto-conical or funnel-shaped element 51 which is secured, as by welding, at the inner end of the line 44 and is positioned in the outlet passage of the valve 11. As shown in FIG. 2, the enlarged end of the funnel-shaped element 51 fits relatively closely in the internal passage of the valve outlet so as to provide a gradually converging fluid flow path between the valve outlet and the restricted withdrawal line 44. The streamlined flow effect thus imparted to the mixed gas and liquid sample avoids severe turbulence in this region and facilitates entrainment of the liquid portion of the sample in the gas portion thereof. For sealing the connection between the valve outlet 43 and the withdrawal line 44, a cup-shaped element 52 is threadedly secured, as at 53, in the valve outlet 43 and the end of the withdrawal line 44 projects through an opening 54 in the base of the cup-shaped element 52 into the interior of the valve outlet. Suitable packing 56 is disposed in the annular space between the cup-shaped element 52 and the line 44 and a packing gland 57 is threaded into the outer end of the element 52 for sealing the connection against the passage of fluid.

In using the sampling apparatus it will be understood that the adapter body 14 is already in place on the pipe line but may be fitted with a different type of internal plug such as shown in my aforementioned copending application Serial No. 160,222 for obtaining pressure readings or the like. In any event, when it is desired to obtain a fluid sample, the valve 11 is first attached to the adapter body 14 and a suitable tool such as shown in my U.S. Patent No. 2,744,310 is connected to the outlet side of the valve 11. With the valve 11 open the gage carrier plug or other type of internal plug which may happen to be fitted in the adapter body is then removed by means of the tool. The valve 11 is then closed, the tool is detached from the valve, and the removed plug is then disconnected from the tool. At this point, the special sampling carrier plug 24 is preassembled with the coupling 36, the extension nipple 37, and the fluid intake 38. This entire subassembly is then mounted on the tool which is then reconnected to the outlet of the valve 11. The valve 11 is then opened and by manipulation of the tool the plug 24 and its sampling attachments are installed in the adapter body 14 as shown in the drawing. The operating part of the tool is then retracted, the valve 11 is closed, and the tool is disconnected from the valve. Finally, the withdrawal assembly 12 is mounted on the valve outlet by the arrangement shown in FIG. 2 and the sampling device is then ready for use.

When it is desired to take a sample from the pipe line, the main valve 11 is opened with the valves 47 and 49 remaining closed. As a result, it will be seen that the pipe line is then placed in direct fluid communication with the fluid intake 38, the extension nipple 37 and coupling 36, the inner bore 33 of the plug 24, the valve 11, and the sample withdrawal lines 46, 44, and 48. Next, the horizontal valve 47 is opened slightly to permit venting of fluid under pressure from the pipe line. As the gas under high pressure is thus allowed to bleed through the slightly open valve 47, liquid adjacent the bottom wall portion of the pipe line will be sucked up or entrained through the fluid intake element 38 and thence through the apparatus and if the bleeding is properly controlled the liquid will then deposit or accumulate in the vertical tube or pipe 48. When a sufficient sample has thus accumulated, the valve 47 and the valve 11 are then closed and the liquid sample is then removed through the valve 49 into a suitable sample container for subsequent analysis and study.

Ordinarily, upon completion of the sampling procedure, the plug 24 and its sampling attachments may then be removed and the original gage carrier plug or other internal plug reinstalled by means of the tool referred to above. At this point, the valve 11 may then be removed along with the sample withdrawal assembly 12 and the entire sampling procedure may then be repeated at other appropriate points in the pipe line or vessel undergoing study.

Although the invention has been described with reference to a particular structural embodiment thereof, it is to be understood that various modifications and alternatives may be resorted to without departing from the scope of the invention as defined in the appended claim.

I claim:

Sampling apparatus for use with a container such as a conduit or vessel containing fluid under pressure, said apparatus comprising a tubular body adapted to be secured at one end portion thereof at an opening in a container wall, an internal carrier plug extending into the opposite end portion of said body and removably mounted within the bore of said body by means of a threaded connection with said opposite end portion, said plug having a fluid passage extending axially therethrough, elongated tubular sampling means connected to the inner end of said plug, a valve having a relatively large fluid passage therethrough including a fluid inlet connected to said opposite end portion of said body and a fluid outlet, a relatively restricted fluid sample withdrawal line connected to said outlet and extending generally vertically therefrom, means at said fluid outlet providing a gradually converging fluid flow path between said valve passage and said line, a generally horizontal branch conduit extending from said line and provided with a valve for controlled bleeding of vapors, and another branch conduit depending generally vertically from said first-named branch conduit and provided with a valve for controlled removal of a liquid sample.

References Cited in the file of this patent

UNITED STATES PATENTS

| | | |
|---|---|---|
| 1,108,278 | Thomas | Aug. 25, 1914 |
| 2,119,288 | Raymond | May 31, 1938 |
| 2,187,840 | Penick | Jan. 23, 1940 |
| 2,222,047 | Snyder | Nov. 19, 1940 |
| 2,231,448 | Hooper | Feb. 11, 1941 |
| 2,581,914 | Darrow | Jan. 8, 1952 |

FOREIGN PATENTS

| | | |
|---|---|---|
| 703,079 | Great Britain | Jan. 27, 1954 |